(12) United States Patent
Au

(10) Patent No.: US 12,319,434 B2
(45) Date of Patent: Jun. 3, 2025

(54) DETERMINING THE POSITION OF ONE OR MORE COMPONENTS OF A LANDING GEAR ASSEMBLY OF AN AIRCRAFT

(71) Applicant: Airbus Operations Limited, Bristol (GB)

(72) Inventor: Ting Yu Au, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 296 days.

(21) Appl. No.: 17/954,196

(22) Filed: Sep. 27, 2022

(65) Prior Publication Data

US 2023/0099541 A1 Mar. 30, 2023

(30) Foreign Application Priority Data

Sep. 28, 2021 (GB) ...................................... 2113847

(51) Int. Cl.
*B64D 45/00* (2006.01)
*B64C 25/34* (2006.01)
(Continued)

(52) U.S. Cl.
CPC .......... *B64D 45/0005* (2013.01); *B64C 25/34* (2013.01); *B64C 25/50* (2013.01); *G01S 17/88* (2013.01)

(58) Field of Classification Search
None
See application file for complete search history.

(56) References Cited

U.S. PATENT DOCUMENTS 8,042,765 B1 10/2011 Nance
9,068,809 B1 6/2015 Lagally et al.
(Continued)

FOREIGN PATENT DOCUMENTS

EP 3 169 588 5/2017
GB 2574441 A1 12/2019
(Continued)

OTHER PUBLICATIONS

Combined Search and Examination Report for GB Application No. 2113847.4, dated Mar. 7, 2022, 6 pages.
(Continued)

*Primary Examiner* — Peter D Nolan
*Assistant Examiner* — Jacob Kent Besteman-Street
(74) *Attorney, Agent, or Firm* — Nixon & Vanderhye P.C.

(57) ABSTRACT

A method of determining the position of one or more components of a landing gear assembly of an aircraft is disclosed including scanning the one or more components with a lidar system to generate a set of position data points, each position data point comprising a set of three orthogonal position values. The position data points are partitioned into one or more clusters using a distance metric. Each cluster is determined to represent a component of the landing gear assembly. The position of the components are then determined from the position data points in the clusters. The value of the distance metric for a first position data point and a second position data point is representative of the difference between a first position value of the three orthogonal position values of the first position data point and the corresponding first position value of the three orthogonal position values of the second position data point.

14 Claims, 7 Drawing Sheets

(51) Int. Cl.
    *B64C 25/50*       (2006.01)
    *G01S 17/88*       (2006.01)

(56)                References Cited

U.S. PATENT DOCUMENTS

| | | | |
|---|---|---|---|
| 9,671,314 | B2 | 6/2017 | Followell et al. |
| 9,696,148 | B2 | 7/2017 | Crow, Jr. |
| 9,771,166 | B2 | 9/2017 | Wilson et al. |
| 10,160,536 | B2 | 12/2018 | Necci et al. |
| 10,317,533 | B2 | 6/2019 | Cherepinsky et al. |
| 11,187,793 | B1* | 11/2021 | Liu ................... G05D 1/0214 |
| 2009/0187293 | A1* | 7/2009 | Trotter ................ B64C 25/26 701/16 |
| 2014/0222325 | A1* | 8/2014 | Followell ............... B64F 5/60 701/34.3 |
| 2017/0139045 | A1* | 5/2017 | Cherepinsky .......... G01S 17/88 |
| 2018/0170531 | A1 | 6/2018 | Cokonaj et al. |
| 2019/0256226 | A1* | 8/2019 | Shapoury ................. G06T 7/73 |
| 2019/0359326 | A1* | 11/2019 | Marles .............. B64D 45/0005 |
| 2019/0375520 | A1* | 12/2019 | Parker ................ G01M 5/0091 |
| 2020/0070960 | A1* | 3/2020 | Parker ................... G01G 19/07 |
| 2020/0174131 | A1* | 6/2020 | Chen ................... G01S 17/931 |
| 2020/0217658 | A1 | 7/2020 | Abdelli |
| 2020/0290750 | A1* | 9/2020 | Ferrell .................. B64D 43/00 |
| 2021/0356599 | A1* | 11/2021 | Liu ................... B60W 60/0011 |
| 2022/0179080 | A1* | 6/2022 | Jeong ................... G01S 7/4808 |

FOREIGN PATENT DOCUMENTS

| | | | | |
|---|---|---|---|---|
| GB | 2574441 A8 | 12/2019 | | |
| GB | 2583182 | 10/2020 | | |
| GB | 2587416 | 3/2021 | | |
| GB | 2587416 A | * 3/2021 | ............ | B64C 25/28 |
| WO | 2016/011099 | 1/2016 | | |

OTHER PUBLICATIONS

Peng Liang et al. "Lidar Point Cloud Guided Monocular 3D Object Detection", arXiv:2104.09035, Cornell University Library, XP091046046, nine pages, Sep. 8, 2021.

Extended European Search Report For Application No. EP 22197779. 6, ten pages, dated Feb. 14, 2023.

\* cited by examiner

DETERMINING THE POSITION OF ONE OR MORE COMPONENTS OF A LANDING GEAR ASSEMBLY OF AN AIRCRAFT

CROSS RELATED APPLICATION

This application claims priority to United Kingdom Patent Application GB 2113847.4 filed Sep. 28, 2021, the entire contents of which is hereby incorporated by reference.

TECHNICAL FIELD

The present disclosure relates to methods and systems for determining the position of one or more components of a landing gear assembly of an aircraft, in particular using lidar ("light detection and ranging" or "laser imaging, detection, and ranging", also sometimes known as 3D laser scanning).

BACKGROUND OF THE INVENTION

In aircraft, it is often desirable to monitor the position of the components of a landing gear assembly, for example to confirm that it has correctly extended or retracted. This is usually done using sensors such as proximity sensors. However, it is a disadvantage of such systems that a large number of sensors are required to monitor the various different components of a landing gear assembly. In some cases, up to fifty sensors may be required.

It is known to use a camera to allow a pilot to view a landing gear assembly so that the positions of the components can determined visually, generally in addition to other sensors such as proximity sensors being used. However, it is desirable not to have to rely on a manual determination made by the pilot as to the position of the components of the landing gear assembly, and, depending on environmental conditions, such manual determinations may not be easy to make.

It is also known to use other position sensing systems to determine the position of the components of a landing gear assembly. GB 2587416 A (Airbus Operations Limited) published Mar. 31, 2021 discloses the use of various sensing systems, including lidar systems, to determine the positions of the components of a landing gear assembly. However, a disadvantage of such systems is that they can require considerable processing resources to make their determination from the data provided by the sensing systems. In addition, systems that could determine the positions of the components from the sensing data with greater accuracy and reliability would be desirable.

The present invention seeks to solve and/or mitigate some or all of the above-mentioned problems. Alternatively and/or additionally, the present invention seeks to provide improved methods and systems for determining the position of one or more components of a landing gear assembly of an aircraft.

SUMMARY OF THE INVENTION

The present invention provides, according to a first aspect, a method of determining the position of one or more components of a landing gear assembly of an aircraft, the method comprising the steps of:

scanning the one or more components of the landing gear assembly with a lidar system to generate a set of position data points, wherein each position data point comprises a set of three orthogonal position values;

partitioning the set of position data points into one or more clusters, wherein two position data points are determined to be in the same cluster if a distance metric for the two position data points is below a threshold;

determining, for each cluster of the one or more of the clusters, a component of the one or more components of the landing gear assembly that the cluster represents; and determining, for each component of the one or more of the components of the landing gear assembly, the position of the component from the position data points in the cluster representing the component;

wherein the value of the distance metric for a first position data point and a second position data point is representative of the difference between a first position value of the three orthogonal position values of the first position data point and the corresponding first position value of the three orthogonal position values of the second position data point.

In this way, the positions of the different components of the landing gear assembly (i.e. the parts or related collections of parts) can be determined, by finding a cluster of positon data points that corresponds to a component, and then determining a position for the cluster. The distance metric is used to decide whether two position data points belong to the same cluster. The distance metric gives a distance between two position data points using only one of the three possible orthogonal position values, so gives the same result when position data points are the same distance along the axis used by that position value, regardless of how close or distant the position data points are along the axes used by the other orthogonal position values. This makes the distance metric more computationally efficient to determine, as it requires only finding the difference between two values, rather than requiring the actual spatial distance between the position data points to be found, i.e. the Euclidean distance, which would require involving finding the difference between all three orthogonal position values, and then performing a calculation on all three of those differences. Further, it has been found that, surprisingly, using only a single position value from each position data point to determine the distance metric does not cause the determination of the positions of the components of the landing gear assembly to be less accurate. In fact, even more surprisingly, it has been found that it results in greater accuracy, by circumventing the problem of occlusion of features.

It will be appreciated that the clusters generated by the method may include clusters that do not correspond to any component of the landing gear system. For example, it may be that the area scanned by the lidar system includes a component that is not part of the landing gear system, for example a sensor mounted on the underside of the aircraft. In this case, a cluster that does not correspond to a component of the landing gear system can simply be ignored.

The three orthogonal position values of the position data point may be a horizontal position value, a vertical position value and a depth position value. In this case, the distance metric may be representative of the difference between the horizontal position values of the first position data point and the second position data point. The landing gear assembly may comprise a set of landing gear wheels, and the horizontal position value of a position data point may be indicative of a position along a line perpendicular to the plane through which the landing gear wheels move when the landing gear assembly is extended. The vertical position value of a position data point may be indicative of a position along a line perpendicular to the bottom surface of the aircraft body in which the landing gear assembly is mounted.

The depth position value of a position data point may be indicative of a position along a line from the lidar system to the landing gear assembly parallel to the bottom surface of the aircraft body in which the landing gear assembly is mounted.

The landing gear assembly may comprise a set of landing gear wheels, and the set of landing gear wheels may be a component of the one or more components of the landing gear assembly. Alternatively, the combination of the landing gear wheels and the strut on which the landing gear wheels are mounted may be a component of the one or more components of the landing gear assembly. The landing gear assembly may comprise one or more doors, and each of the one or more doors may be a component of the one or more components of the landing gear assembly. In other words, in each case a single position is determined for the part or collection of parts considered to make up a single component of the landing gear assembly.

The landing gear assembly may comprise a set of landing gear wheels, and the lidar system may be positioned in the plane through which the landing gear wheels move when the landing gear assembly is extended.

The position of a component of the one or more components of the landing gear assembly may be determined to be the centroid of the position data points in the cluster representing the component. However, it will be appreciated that other methods could be used to determine a position for a cluster from the position data points it comprises, of which various will be known to the skilled person.

The method may further comprise, prior to the step of partitioning the set of position data points into one or more clusters, the step of removing position data points from the set of position data points that have a depth position value greater than a threshold value. Alternatively and/or additionally, the method may further comprise, prior to the step of partitioning the set of position data points into one or more clusters, the step of removing position data points from the set of position data points that have a depth position value less than a threshold value. In each case, this allows position data points outside a desired area to be omitted before the position data points are clustered. This allows, for example, anything outside the area in which the landing gear assembly is extended to be omitted.

The positions of the one or more components of the landing gear assembly of an aircraft may be tracked as the landing gear assembly moves from the retracted position to the extended position or from the extended position to the retracted position.

The present invention provides, according to a second aspect, an aircraft comprising:
a landing gear assembly comprising one or more components;
a lidar system arranged to scan the one or more components of the landing gear assembly and generate a set of position data points, wherein each position data point comprises a set of three orthogonal position values; and
a computer system arranged to determine, from the set of position data points, the position of one or more components of the landing gear assembly in accordance with any of the methods described above.

Such a computer system may comprise a processor and memory, and may be a conventional computer system, a computer system specifically designed for use in aircraft, or any other suitable computer system.

The present invention provides, according to a third aspect, a non-transitory computer readable medium comprising computer-readable program code for determining the position of one or more components of a landing gear assembly of an aircraft, the computer-readable program code arranged, when executed in a computer system of an aircraft comprising:
a landing gear assembly comprising one or more components; and
a lidar system arranged to scan the one or more components of the landing gear assembly and generate a set of position data points, wherein each position data point comprises a set of three orthogonal position values;
to cause the computer system to determine, from the set of position data points, the position of one or more components of the landing gear assembly in accordance with any of the methods described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 4b shows a 2D plot of filtered position data points of FIG. 4a;

DETAILED DESCRIPTION

Figure 1A:
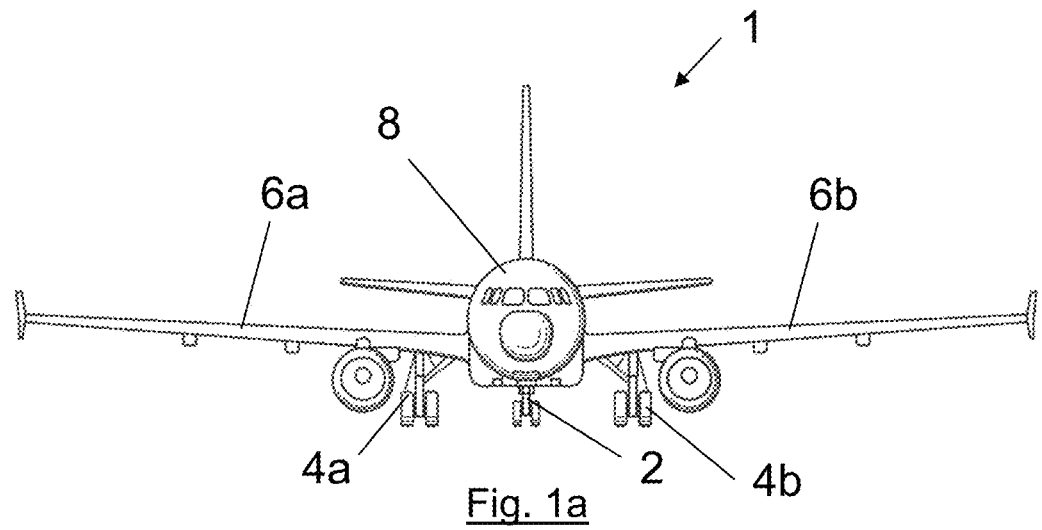
FIGS. 1a and 1b show a front and perspective view respectively of an aircraft including a system according to example embodiments of the invention.
Figure 1B:
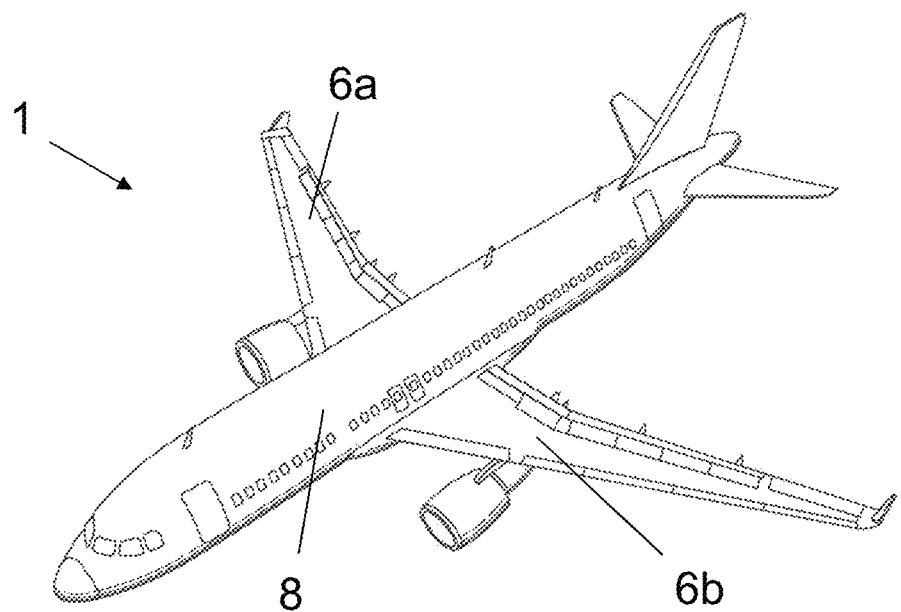

FIGS. 1a and 1b show a front view and perspective view respectively of an aircraft 1 comprising a system in accordance with embodiments of the invention. The aircraft comprises a fuselage 8 with wings 6a and 6b mounted either side. As can be seen in particular from FIG. 1a, a nose landing gear 2 mounted on the underside of the fuselage 8, and main landing gear 4a and 4b mounted on the underside of the wings 6a and 6b respectively, are all in extended configuration.

Figure 2:
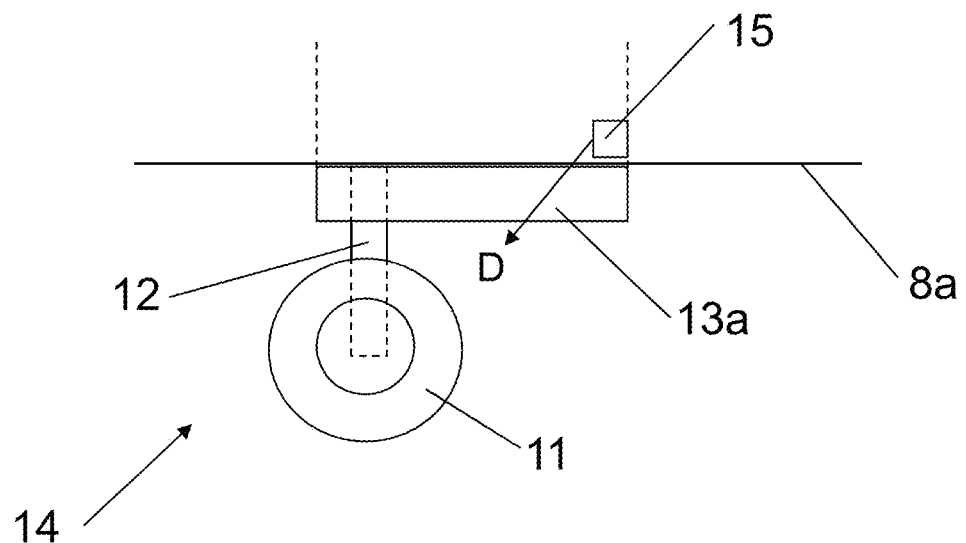
FIG. 2 shows a side view of the bottom part the fuselage of the aircraft in the area of the nose landing gear.

FIG. 2 shows a side view of the bottom part of the fuselage 8 in the area of the nose landing gear 2. As can be seen, the nose landing gear 2 comprises a wheel arrangement 14 comprising a wheel 11 mounted on a strut 12. A right-side (as viewed facing the nose of the aircraft 1) door 13a of the nose landing gear 2 in the underside 8a of the fuselage 8 is in the open position, so that the nose landing gear 2 has been able to extend. The nose landing gear 2 also comprises a corresponding left-side door 13b, not shown in FIG. 2, which is also in the open position.

The nose landing gear 2 as shown in FIG. 2 is part way between its retracted configuration and extended configuration. In the retracted configuration, the strut 12 is rotated anticlockwise (as viewed from the side in FIG. 2) so that the wheel arrangement 14 is above the underside 8a of the fuselage 8 and the right-side door 13a and left-side door 13b can be closed. To move to the extended configuration the right-side door 13a and left-side door 13b are opened, and the strut 12 is rotated clockwise to the configuration shown in FIG. 2. The right-side door 13a and left-side door 13b are then closed again, to give the extended configuration.

A lidar scanner 15 is mounted on the back interior wall of the nose landing gear 2 (i.e. the wall furthest from the nose of the aircraft 1), above the level of the right-side door 13a and left-side door 13b when closed. The lidar scanner 15 scans in the direction marked by the arrow D in FIG. 2, i.e. in the general direction of the wheel arrangement 14. However, in other embodiments the lidar scanner may be positioned, for example, on the front or side interior walls of the landing gear system, or in any other positions from which the components of the landing gear can be scanned by the lidar scanner.

Figure 3:
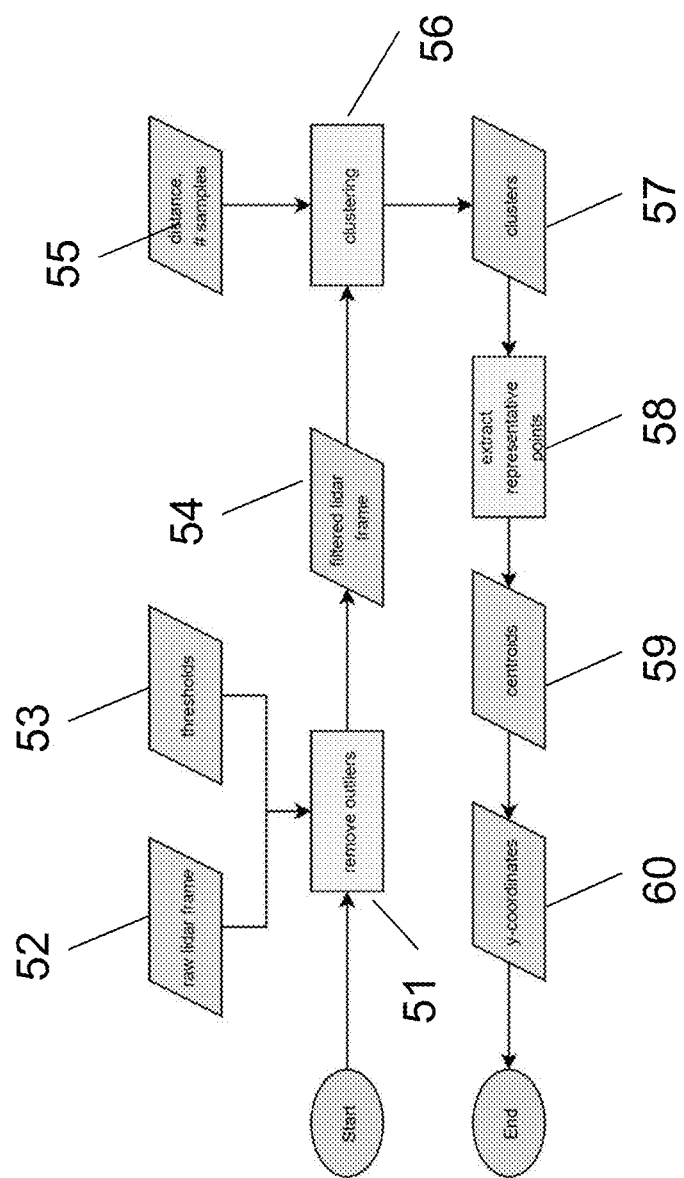
FIG. 3 shows a flowchart of a method of determining the position of one or more components of a landing gear assembly according to example embodiments of the invention.

A method of determining the position of components of the nose landing gear 2 using the lidar scanner 15 is now described with reference to the flowchart of FIG. 3.

Initially, the lidar scanner 15 scans the general area in which the components of the nose landing gear 2 are positioned. This generates a raw lidar frame 52, i.e. a set of position data points obtained by the lidar scanner 15. Each position data point comprises a set of three orthogonal position values. The orthogonal position values for each position data point are determined by the lidar scanner 15 based on the direction its laser is pointing and the time the light of the laser takes to be returned, in accordance with standard methods.

Figure 4A:
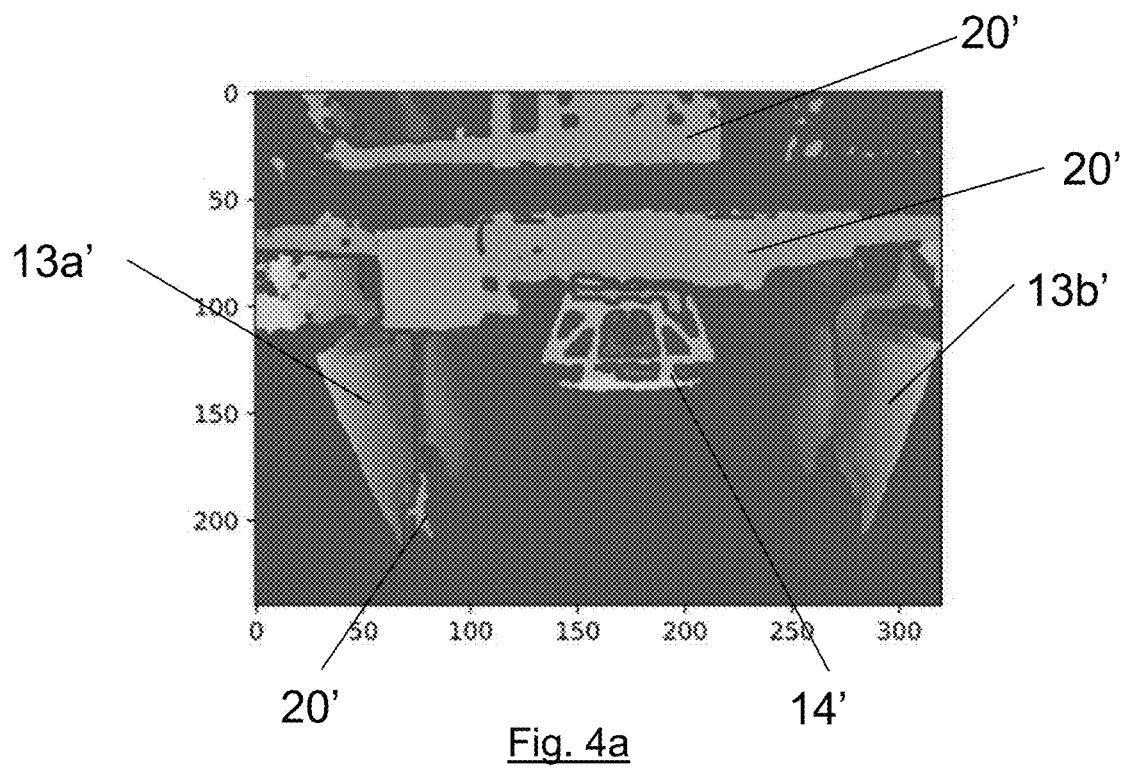
FIG. 4a shows a 2D plot of position data points obtained by a scan of the nose landing gear by a lidar system.

The three orthogonal position values of the position data points are a horizontal positon value, corresponding to a horizontal position as considered when facing the nose of the aircraft 1; a vertical position value, corresponding to a vertical position as considered when facing the nose of the aircraft 1; and a depth position value, corresponding to a distance from the lidar scanner 15. An example set of position data points 52 is shown in FIG. 4a as a 2D plot, on which the horizontal positon value of a position data point is indicated by the position of the plotted point on the horizontal axis, the vertical positon value is indicated by the position of the plotted point on the vertical axis, and the depth position value is indicated by the colour of the plotted point. As can be seen, there is a subset of position data points 13a' corresponding to the right-side door 13a, a subset of position data points 13b' corresponding to the left-side door 13b, and a subset of position data points 14' corresponding to the wheel arrangement 14. There are also subsets of position data points 20' corresponding other parts of the aircraft 1 scanned by the lidar scanner 15, which are not components of the nose landing gear 2.

Figure 4B:
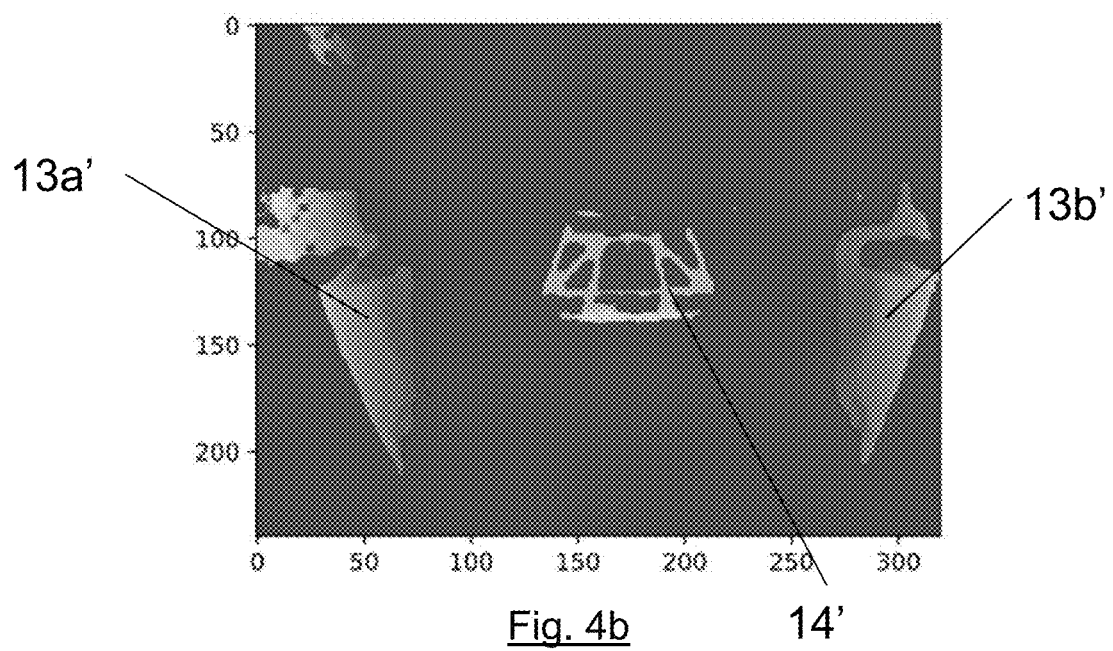

Once the set of position data points 52 has been obtained from the lidar scanner 15, thresholds 53 are used to remove outliers from the set of position data points (step 51). The thresholds 53 define maximum and minimum values for the depth position value of each position data point, with position data points with a depth position value outside the thresholds 53 being removed from the set of position data points. The removal of the position data points gives a filtered lidar frame 54, i.e. a filtered set of the position data points shown in FIG. 4a, as shown in FIG. 4b again as a 2D plot. As can be seen, the thresholds 53 are chosen so that the subsets of position data points 13a', 13b' and 14 corresponding to the right-side door 13a, left-side door 13b and wheel arrangement 14 respectively of the nose landing gear 2 are retained, while the subsets of position data points 20' corresponding other parts of the aircraft 1 are removed. It will be appreciated that this can be done by selecting as the minimum threshold the depth position value corresponding to the closest any part of a component of the nose landing gear 2 is to the lidar scanner 15, and as the maximum threshold the depth position value corresponding to the furthest any part of a component of the nose landing gear 2 is from the lidar scanner 15.

It will be appreciated that in embodiments thresholds may be applied to the horizontal and/or vertical position values as well. Further, particularly but not exclusively where the lidar scanner is mounted in a different position with respect to the landing gear, for example to the side of the landing gear, thresholds using only the horizontal and/or vertical position values may be used. Finally, thresholds may be based on combinations of the orthogonal position values.

Next, a clustering algorithm is applied to the filtered set of position data points 54 (step 56). The clustering algorithm groups together position data points that correspond to the same component of the nose landing gear 2, to give a set of clusters 57. Various clustering algorithms will be known to the skilled person, and it will be appreciated that any appropriate clustering algorithm could be used. In embodiments, the well-known DBSCAN (density-based spatial clustering of applications with noise) algorithm is used.

Figure 5:
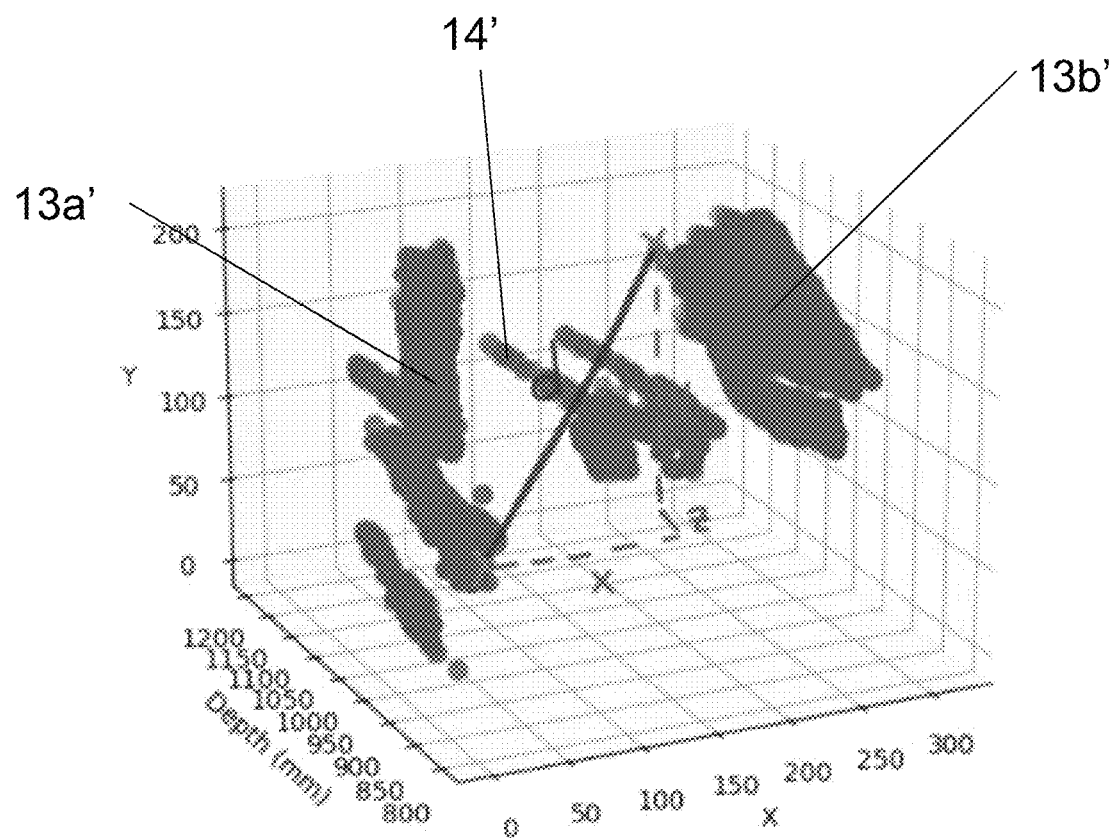
FIG. 5 shows a 3D plot of the position data points obtained by the lidar system.

Clustering algorithms determine if two position data points should belong to the same cluster using a distance metric, i.e. a value for the distance between the two position data points. Conventionally, the Euclidean distance between the two position data points, i.e. the actual spatial distance, is used. FIG. 5 is a 3D plot of the position data points obtained by the lidar system, which shows the Euclidean distance between two position data points as the distance d. As can be seen, the Euclidean distance d would need to be calculated from the horizontal distance x, the vertical distance y, and the depth distance z, between the two position data points.

In contrast to this conventional use of clustering algorithms, in embodiments only the difference between one of the orthogonal position values of each of the two position data values is used as a distance metric 55. In particular, only the difference between the horizontal position values of each position data value is used, as shown by the horizontal distance x in FIG. 5. It has been found that this circumvents the problem of occlusion of features, and gives better clustering results than when the Euclidean distance is used. In addition, as only the difference between two orthogonal position values is required, the use of this distance metric 55 is computationally more efficient than using the Euclidean distance, which requires a calculation involving the differences for all three of the orthogonal position values.

In other embodiments, another of the orthogonal positon values may be used to provide the difference for the distance metric, for example the difference between the vertical position values of each position data value, or the difference between the depth position values of each position data value.

Figure 6:
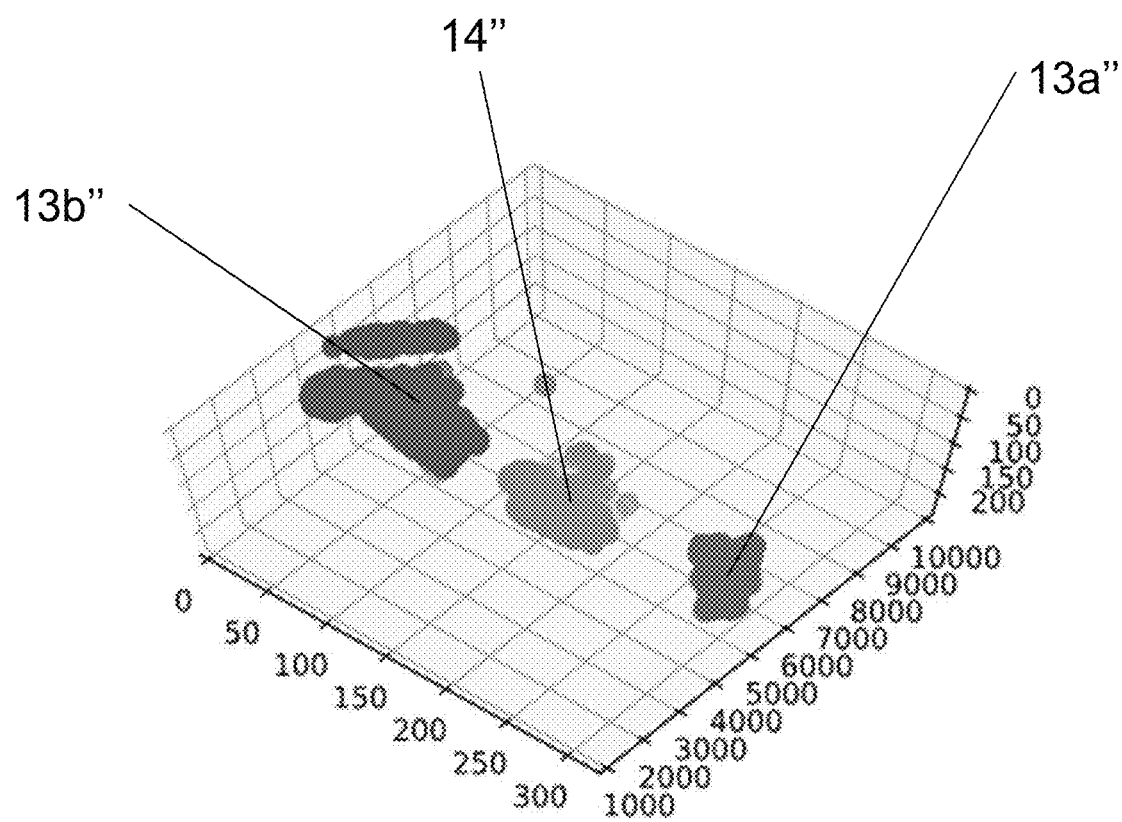
FIG. 6 shows a 3D plot of the position data points obtained by the lidar system partitioned into clusters.

FIG. 6 shows a 3D plot of the clusters 57 of the filtered position data points 54. As can be seen, there are three clusters, a cluster 13a" shown in green that corresponds to the right-hand door 13a of the nose landing gear 2, a cluster 13b" shown in blue that corresponds to the left-hand door 13*b* of the nose landing gear 2, and a cluster 14''' shown in orange that corresponds to the wheel arrangement 14 of the nose landing gear 2.

Next, for each of the clusters 57 a representative position point is determined (step 58). These representative position points are the centroids 59 of the clusters 57, i.e. the arithmetic mean of the position data points of the cluster. Thus, the centroids 57 provide for each component of the nose landing gear 2 a single position in space that is representative of the position of that component. In other embodiments different representative position points for the clusters may be used, for example the centre point of the outermost position data points of the clusters. Various other methods of identifying representative position points will be apparent to the skilled person.

The centroids 59 can then be used to give a position for the components of the nose landing gear 2. For example, the vertical positions of the centroids, the y-coordinates 60, can be used to determine whether the nose landing gear 2 has been properly extended or retracted, by determining if the vertical positons of the components of the nose landing gear 2 are as expected.

Figure 7A:
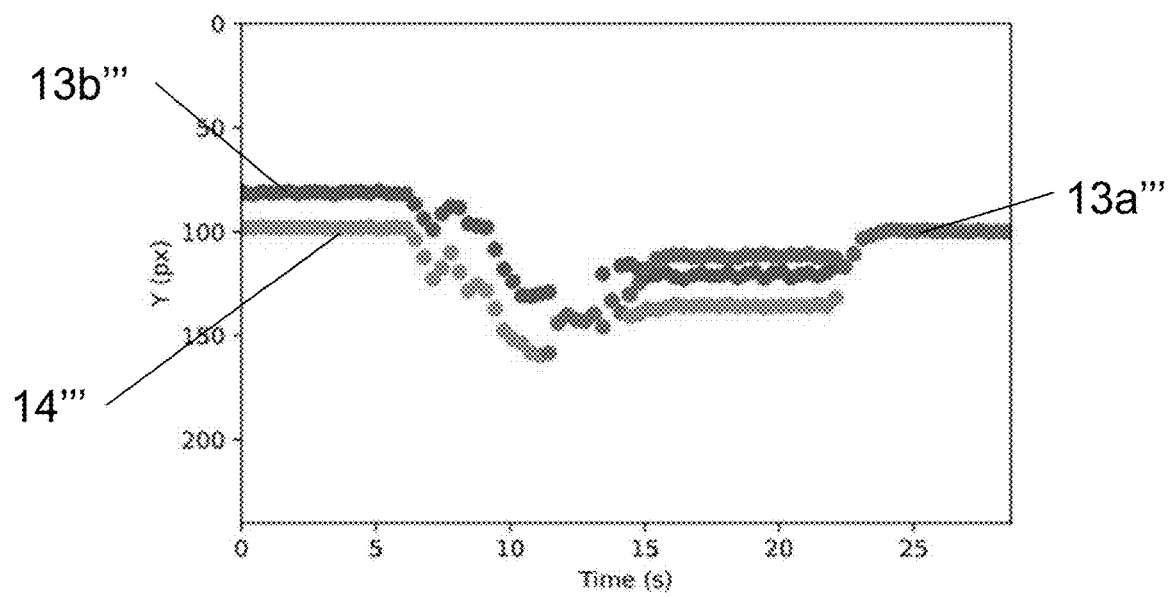
FIGS. 7a and 7b show plots of the positions indicated by the clusters over time.
Figure 7B:
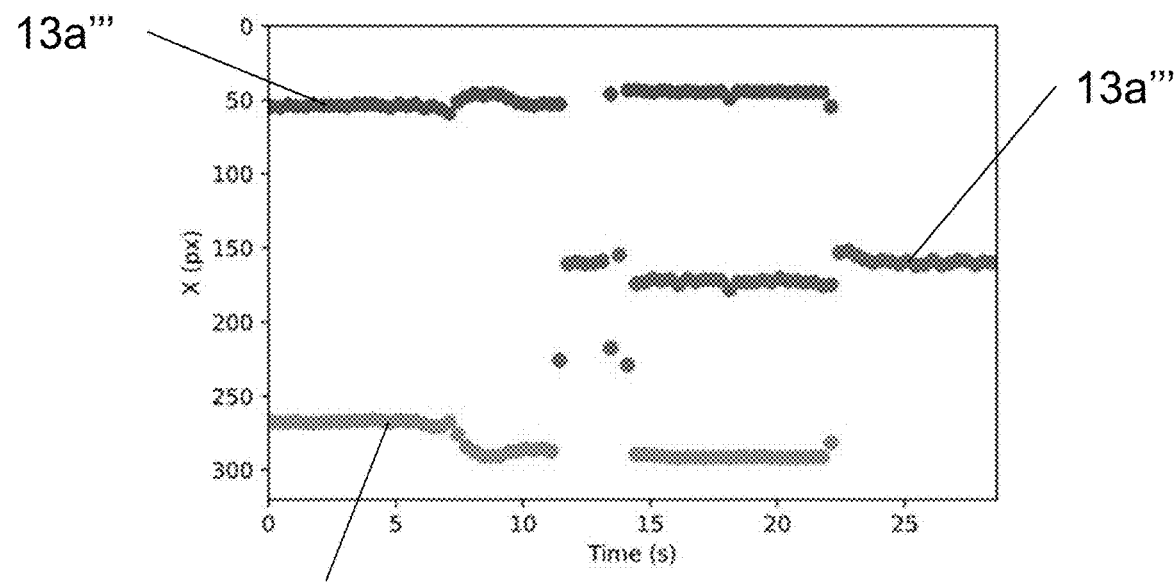

The positions of the components can also be tracked as the nose landing gear 2 moves from the retracted to the extended configuration or vice versa, by repeating the method of FIG. 2 over time. FIGS. 7*a* and 7*b* show the change in position of the centroids 59 while the nose landing gear 2 moves from the extended configuration to the retraction configuration, with FIG. 7*a* showing the y-coordinates 60 (i.e. vertical position) of the centroids 59 of the clusters 57 over time, and FIG. 7*b* showing the horizontal position. As can be seen from FIG. 7*a* in particular, initially the nose landing gear 2 is in the extended configuration, with the right-hand door 13*a* and left-hand door 13*b* closed and the wheel arrangement 14 in the lowered position. The centroid 13*a*''' corresponding to the right-hand door 13*a* and the centroid 13*b*''' corresponding to the left-hand door 13*b* then move downwards as the right-hand door 13*a* and left-hand door 13*b* open. The centroid 14''' corresponding to the wheel arrangement 14 the moves upwards as the wheel arrangement 14 retracts, while the right-hand door 13*a* and left-hand door 13*b* stay in position. Finally, once the wheel arrangement 14 has been retracted, the centroids 13*a*''' and 13*b*''' move upwards as the right-hand door 13*a* and the left-hand door 13*b* are closed.

While the present invention has been described and illustrated with reference to particular embodiments, it will be appreciated by those of ordinary skill in the art that the invention lends itself to many different variations not specifically illustrated herein.

In particular, while the above embodiment has been described with reference to a nose landing gear, it will be appreciated that the invention is equally applicable to other landing gear, such as main landing gear, as well as to nose or other landing gear that moves between retracted and extended configuration in ways different to that described above, and/or that include different components to those described above. (For example landing gear with a different number of doors that are positioned and/or move in different ways, or that have no doors at all; and/or that have different wheel assemblies that operate in different ways, or that do not comprise wheels.)

Where in the foregoing description, integers or components are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of determining the position of one or more components of a landing gear assembly of an aircraft, wherein the landing gear assembly comprises a set of landing gear wheels, the method comprising the steps of:
   scanning the one or more components of the landing gear assembly with a lidar system to generate a set of position data points, wherein each position data point comprises a set of three orthogonal position values;
   partitioning the set of position data points into one or more clusters, wherein two position data points are determined to be in the same cluster if a distance metric for the two position data points is below a threshold;
   determining, for each cluster of the one or more of the clusters, a component of the one or more components of the landing gear assembly that the cluster represents; and
   determining, for each component of the one or more of the components of the landing gear assembly, the position of the component from the position data points in the cluster representing the component;
   wherein the value of the distance metric for a first position data point and a second position data point is determined based solely on the difference between a horizontal position value of the three orthogonal position values of the first position data point and the corresponding horizontal position value of the three orthogonal position values of the second position data point,
   wherein the horizontal position value of a position data point is indicative of a position along a line perpendicular to the plane through which the landing gear wheels of the landing gear assembly move when the landing gear assembly is extended, and
   wherein the positions of the one or more components of the landing gear assembly of the aircraft are tracked using the lidar system during the physical movement of the landing gear assembly as the landing gear assembly moves from the retracted position to the extended position or from the extended position to the retracted position.

2. A method as claimed in claim 1, wherein the three orthogonal position values of the position data point also include a vertical position value and a depth position value.

3. A method as claimed in claim 2, wherein the vertical position value of a position data point is indicative of a position along a line perpendicular to the bottom surface of the aircraft body in which the landing gear assembly is mounted.

4. A method as claimed in claim 2, wherein the depth position value of a position data point is indicative of a position along a line from the lidar system to the landing gear assembly parallel to the bottom surface of the aircraft body in which the landing gear assembly is mounted.

5. A method as claimed in claim 1, wherein the landing gear assembly comprises a set of landing gear wheels, and the set of landing gear wheels is a component of the one or more components of the landing gear assembly.

6. A method as claimed in claim 1, wherein the landing gear assembly comprises a set of landing gear wheels, the landing gear wheels of the landing gear assembly are mounted on a movable strut, and the combination of the landing gear wheels and the strut is a component of the one or more components of the landing gear assembly.

7. A method as claimed in claim 1, wherein the landing gear assembly comprises one or more doors, and each of the one or more doors is a component of the one or more components of the landing gear assembly.

8. A method as claimed in claim 1, wherein the landing gear assembly comprises a set of landing gear wheels, and wherein the lidar system is positioned in the plane through which the landing gear wheels move when the landing gear assembly is extended.

9. A method as claimed in claim 1, wherein the position of a component of the one or more components of the landing gear assembly is determined to be the centroid of the position data points in the cluster representing the component.

10. A method as claimed in claim 1, further comprising, prior to the step of partitioning the set of position data points into one or more clusters, the step of removing position data points from the set of position data points that have a depth position value greater than a threshold value.

11. A method as claimed in claim 1, further comprising, prior to the step of partitioning the set of position data points into one or more clusters, the step of removing position data points from the set of position data points that have a depth position value less than a threshold value.

12. A method as claimed in claim 1, wherein the positions of the one or more components of the landing gear assembly of an aircraft are tracked as the landing gear assembly moves from the retracted position to the extended position or from the extended position to the retracted position.

13. An aircraft comprising:
a landing gear assembly comprising one or more components and a set of landing gear wheels;
a lidar system arranged to scan the one or more components of the landing gear assembly and generate a set of position data points, wherein each position data point comprises a set of three orthogonal position values; and
a computer system arranged to determine, from the set of position data points, the position of one or more components of the landing gear assembly in accordance with a method comprising the steps of:
scanning the one or more components of the landing gear assembly with a lidar system to generate a set of position data points, wherein each position data point comprises a set of three orthogonal position values;
partitioning the set of position data points into one or more clusters, wherein two position data points are determined to be in the same cluster if a distance metric for the two position data points is below a threshold;
determining, for each cluster of the one or more of the clusters, a component of the one or more components of the landing gear assembly that the cluster represents; and
determining, for each component of the one or more of the components of the landing gear assembly, the position of the component from the position data points in the cluster representing the component;
wherein the value of the distance metric for a first position data point and a second position data point is determined based solely on the difference between a horizontal position value of the three orthogonal position values of the first position data point and the corresponding horizontal position value of the three orthogonal position values of the second position data point,
wherein the horizontal position value of a position data point is indicative of a position along a line perpendicular to the plane through which the landing gear wheels of the landing gear assembly move when the landing gear assembly is extended, and
wherein the positions of the one or more components of the landing gear assembly of the aircraft are tracked using the lidar system during the physical movement of the landing gear assembly as the landing gear assembly moves from the retracted position to the extended position or from the extended position to the retracted position.

14. A non-transitory computer readable medium comprising computer-readable program code for determining the position of one or more components of a landing gear assembly of an aircraft, the computer-readable program code arranged, when executed in a computer system of an aircraft comprising:
a landing gear assembly comprising one or more components and a set of landing gear wheels; and
a lidar system arranged to scan the one or more components of the landing gear assembly and generate a set of position data points, wherein each position data point comprises a set of three orthogonal position values;
to cause the computer system to determine, from the set of position data points, the position of one or more components of the landing gear assembly in accordance with a method comprising the steps of:
scanning the one or more components of the landing gear assembly with a lidar system to generate a set of position data points, wherein each position data point comprises a set of three orthogonal position values;
partitioning the set of position data points into one or more clusters, wherein two position data points are determined to be in the same cluster if a distance metric for the two position data points is below a threshold;
determining, for each cluster of the one or more of the clusters, a component of the one or more components of the landing gear assembly that the cluster represents; and
determining, for each component of the one or more of the components of the landing gear assembly, the position of the component from the position data points in the cluster representing the component;
wherein the value of the distance metric for a first position data point and a second position data point is determined based solely on the difference between a horizontal position value of the three orthogonal position values of the first position data point and the corresponding horizontal position value of the three orthogonal position values of the second position data point,
wherein the horizontal position value of a position data point is indicative of a position along a line perpendicular to the plane through which the landing gear wheels of the landing gear assembly move when the landing gear assembly is extended, and
wherein the positions of the one or more components of the landing gear assembly of the aircraft are tracked using the lidar system during the physical movement of the landing gear assembly as the landing gear assembly moves from the retracted position to the extended position or from the extended position to the retracted position.

* * * * *